UNITED STATES PATENT OFFICE.

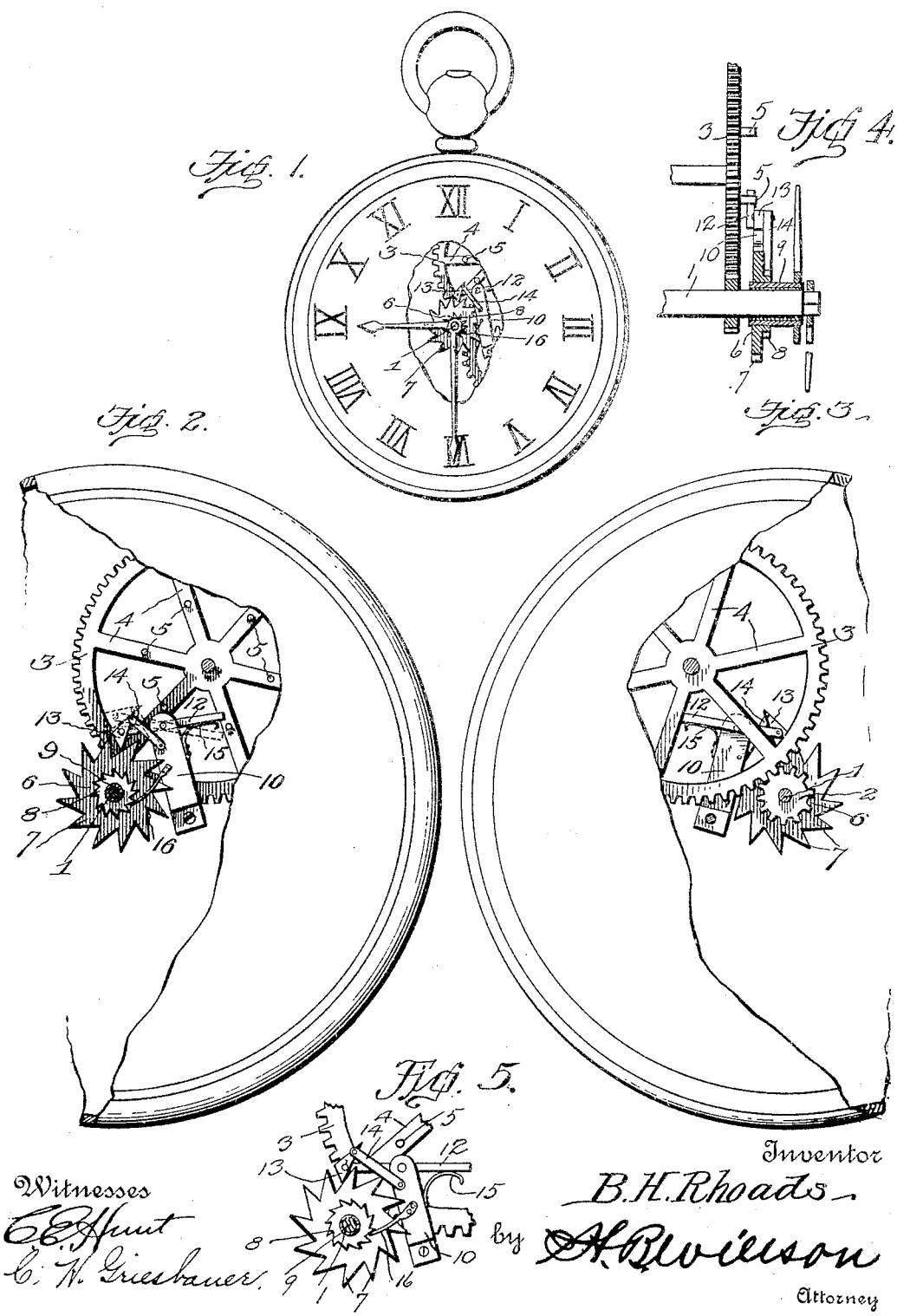

BENJAMIN H. RHOADS, OF MOORELAND, OKLAHOMA TERRITORY.

DIAL-TRAIN FOR TIMEPIECES.

No. 801,914. Specification of Letters Patent. Patented Oct. 17, 1905.

Application filed April 27, 1905. Serial No. 257,634.

*To all whom it may concern:*

Be it known that I, BENJAMIN H. RHOADS, a citizen of the United States, residing at Mooreland, in the county of Woodward, Oklahoma Territory, have invented certain new and useful Improvements in Movements for Watches and Clocks; and I do declare the following to be a full, clear, and exact description of the invention, such as will enable others skilled in the art to which it appertains to make and use the same.

This invention relates to improvements in movements for watches and clocks.

The object of the invention is to provide a movement whereby the hour-hand will remain still while the minute-hand is passing around the entire space on the dial of the clock, at which time the hour-hand will be quickly moved to the next hour.

With the above and other objects in view the invention consists of certain novel features of construction, combination, and arrangement of parts, as will be hereinafter described and claimed.

In the accompanying drawings, Figure 1 is a face view of a watch, parts being broken away to illustrate so much of the works which comprise the invention. Fig. 2 is an enlarged view of the operating mechanism shown in Fig. 1 and showing in full and dotted lines the two positions of the trip-lever. Fig. 3 is a reverse view of the parts shown in Fig. 2, and Fig. 4 is a detail and partial section of the hour-hand mechanism and the post and surrounding sleeve, and Fig. 5 is a similar view of the escapement devices.

Referring more particularly to the drawings, 1 denotes the shaft or arbor on which the minute-hand is fixedly mounted. 2 denotes a spur-gear pinion, which is also fixedly mounted upon said shaft or arbor 1. Journaled in the frame of the watch-works is a spur gear-wheel 3, the teeth of which are adapted to mesh with the teeth of the pinion 2. Said pinion is provided with twelve teeth, while the gear-wheel 3 is provided with seventy-two teeth. The gear-wheel 3 is also provided with six radially-disposed spokes 4, which are spaced equal distances apart, as shown. Each of said spokes is provided with a laterally-projecting trip-pin 5. On the shaft or arbor 1 of the minute-hand is loosely mounted a double ratchet-wheel 6, having an outer series of ratchet-teeth 7 and an inner series of ratchet-teeth 8, each containing twelve teeth. The ratchet-wheel 6 is provided with a laterally-projecting sleeve 9, which loosely surrounds the shaft 1 and has fixedly connected to its outer end the hour-hand of the watch, as shown in Fig. 4.

Pivotally mounted upon a bracket 10 is a trip-lever 12, one end of which normally lies in the path of movement of the trip-pins 5 on the wheel 3. On the opposite end of the trip-lever 12 is pivotally mounted a triangularly-shaped pawl or dog 13, which is adapted to engage the outer series of teeth 7 upon the ratchet-wheel 6. To the outer corner of the pawl is pivotally connected one end of a short controlling bar or lever 14, the opposite end of which is pivotally connected to the bracket 10, as shown. A spring 15 is connected to the bracket 10 and is adapted to engage the free end of the trip-lever 12. A spring 15 is also connected to the bracket 10 and is adapted to engage the inner series of teeth 8 of the ratchet-wheel 6 to prevent a retrograde movement of the wheel 6.

In operation as the shaft 1 and the minute-hand are turned by the usual or any suitable mechanism the pinion 2 on the minute-hand shaft will also be revolved. The pinion 2, being in engagement with the wheel 3, will cause said wheel to be turned, which will successively bring the trip-pins 5 into engagement with the free end of the trip-lever 12, thereby rocking the same against the tension of the spring 15 to the position shown by dotted lines in Fig. 2, whereby the pawl 13 is moved from engagement with the ratchet-wheel 6 and has been turned by the controlling-bar 14 to a position which when the lever 12 is released from the trip-pins 5 of the wheel 3 will be again engaged with the teeth 8 of the ratchet-wheel by the action of the spring 15 to turn said ratchet-wheel 6 to the distance of one tooth. As the sleeve 9 is secured to or a part of the ratchet-wheel 6 and the hour-hand is secured to said sleeve the hour-hand will be turned by the movement of the wheel to the distance of one tooth, which distance is equivalent to the distance between the numerals representing the hours on the dial of the clock. As there are twelve teeth in the spur-gear pinion 2 and seventy-two teeth in the gear-wheel 3, it will be obvious that at each complete revolution of the pinion 2 and the consequent passage of the minute-hand around the dial of the watch or clock that the wheel 3 will have been moved by the pinion 2 the distance of twelve teeth or one-sixth of its circumference, thus bringing one of the pins on each of the six spokes into engagement with the trip-lever 12 at every complete revolution of the pinion 2, thereby turning the ratchet-wheel 6 the distance of one tooth, which will cause the hour-hand mounted on the sleeve thereof to be shifted from one hour to another on the dial of the watch or clock at one movement, the hour-hand thus remaining on the hour while the minute-hand is passing around the entire distance on the face or dial, at which time the hour-hand is again quickly shifted to the next hour. By this arrangement the hour and the number of minutes past the hour may be observed at a glance, the hour-hand always correctly indicating the hour and the minute-hand the number of minutes past that hour.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a watch-movement, the combination with the minute-hand shaft, of a spur-gear pinion fixedly mounted thereon, a spur gear-wheel driven by said pinion, trip devices carried by said wheel, a ratchet-wheel loosely mounted on the minute-hand shaft, means whereby the hour-hand is secured to said ratchet-wheel, and a trip mechanism actuated by the trip devices on said spur gear-wheel to turn said ratchet-wheel and hour-hand at each complete revolution of said minute-hand pinion, substantially as described.

2. In a watch-movement, the combination with the minute-hand shaft, of a spur-gear pinion fixedly mounted thereon, a spur gear-wheel driven by said pinion, trip devices carried by said wheel, a ratchet-wheel loosely mounted on the minute-hand shaft, a sleeve fixed on and projecting laterally from said ratchet-wheel to receive the hour-hand, a pivotally-mounted trip-lever adapted to be engaged by the trip devices on said spur gear-wheel, a pawl carried by said trip-lever, to engage the teeth of said ratchet-wheel, to turn the same and the hour-hand connected thereto from one hour to another on the dial, at each complete revolution of the minute-hand pinion, substantially as described.

3. In a watch-movement, the combination with the minute-hand shaft, of a spur-gear pinion fixedly mounted thereon, a spur gear-wheel driven by said pinion, laterally-projecting trip-pins carried by said wheel, a ratchet-wheel loosely mounted on the minute-hand shaft, a sleeve fixed on and projecting laterally from said ratchet-wheel to receive the hour-hand, a pivotally-mounted spring-actuated trip-lever adapted to be engaged by said pins, a pawl pivotally mounted on said lever to engage and turn the ratchet-wheel and the hour-hand connected thereto at each complete revolution of the minute-hand pinion, a controlling-bar connected to said pawl, a stop or brake-wheel connected to said hour-hand wheel and a spring-pawl adapted to engage said brake-wheel to control the movement of said hour-hand wheel, substantially as described.

In testimony whereof I have hereunto set my hand in presence of two subscribing witnesses.

BENJAMIN H. RHOADS.

Witnesses:
J. E. TANNER,
F. P. DAVIS.